(12) United States Patent
Sakai et al.

(10) Patent No.: US 7,922,335 B2
(45) Date of Patent: Apr. 12, 2011

(54) PROJECTOR

(75) Inventors: Yohei Sakai, Matsumoto (JP); Akira Hashimoto, Shiojiri (JP); Fumihide Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 475 days.

(21) Appl. No.: 12/075,887

(22) Filed: Mar. 15, 2008

(65) Prior Publication Data

US 2008/0231812 A1 Sep. 25, 2008

(30) Foreign Application Priority Data

Mar. 20, 2007 (JP) ................................. 2007-072460
Nov. 5, 2007 (JP) ................................. 2007-287090

(51) Int. Cl.
*F21V 29/00* (2006.01)
(52) U.S. Cl. ........... 353/58; 362/294; 362/345; 362/373
(58) Field of Classification Search .................... 353/57, 353/58, 60, 61; 362/218, 294, 345, 373; 349/5, 7, 8
See application file for complete search history.

(56) References Cited

U.S. PATENT DOCUMENTS

| | | | | |
|---|---|---|---|---|
| 4,630,182 A * | 12/1986 | Moroi et al. | ................... | 362/294 |
| 6,340,237 B1 * | 1/2002 | Koga et al. | ................... | 362/294 |
| 6,558,004 B2 | 5/2003 | Ito et al. | | |
| 6,758,583 B2 * | 7/2004 | Hsu et al. | ..................... | 362/373 |
| 6,840,629 B2 * | 1/2005 | Suzuki et al. | ................... | 353/61 |
| 7,210,825 B2 * | 5/2007 | Watanabe et al. | ............. | 362/373 |
| 7,237,905 B2 | 7/2007 | Yajima et al. | | |
| 7,331,677 B2 | 2/2008 | Horiguchi et al. | | |
| 7,748,850 B2 * | 7/2010 | Lin et al. | .......................... | 353/57 |
| 2004/0246447 A1 | 12/2004 | Shiraishi | | |
| 2007/0115436 A1 | 5/2007 | Takeda et al. | | |
| 2009/0195757 A1 * | 8/2009 | Chen et al. | ....................... | 353/58 |
| 2010/0201955 A1 * | 8/2010 | Jougo | ............................. | 353/58 |

FOREIGN PATENT DOCUMENTS

| | | |
|---|---|---|
| CN | 1584733 A | 2/2005 |
| CN | 1755514 A | 4/2006 |
| JP | 07-311420 | 11/1995 |
| JP | 2002-23261 | 1/2002 |
| JP | 2003-217336 A | 7/2003 |
| JP | 2004-191518 | 7/2004 |
| JP | 2004-191518 A | 7/2004 |
| JP | 2004-191742 A | 7/2004 |
| JP | 2005-024735 | 1/2005 |
| JP | 2005-031549 A | 2/2005 |
| JP | 2005-275301 A | 10/2005 |

OTHER PUBLICATIONS

European Patent Search Report, Aug. 11, 2008, issued in related Patent Application No. EP-08004657.6.

* cited by examiner

*Primary Examiner* — William C Dowling
(74) *Attorney, Agent, or Firm* — AdvantEdge Law Group, LLC

(57) ABSTRACT

A projector includes: a light source lamp; and a cooling device that cools the light source lamp and includes a plurality of cooling fans to deliver air toward the light source lamp. Airflow directions in which the plurality of cooling fans deliver the air toward the light source lamp are different from each other.

5 Claims, 9 Drawing Sheets

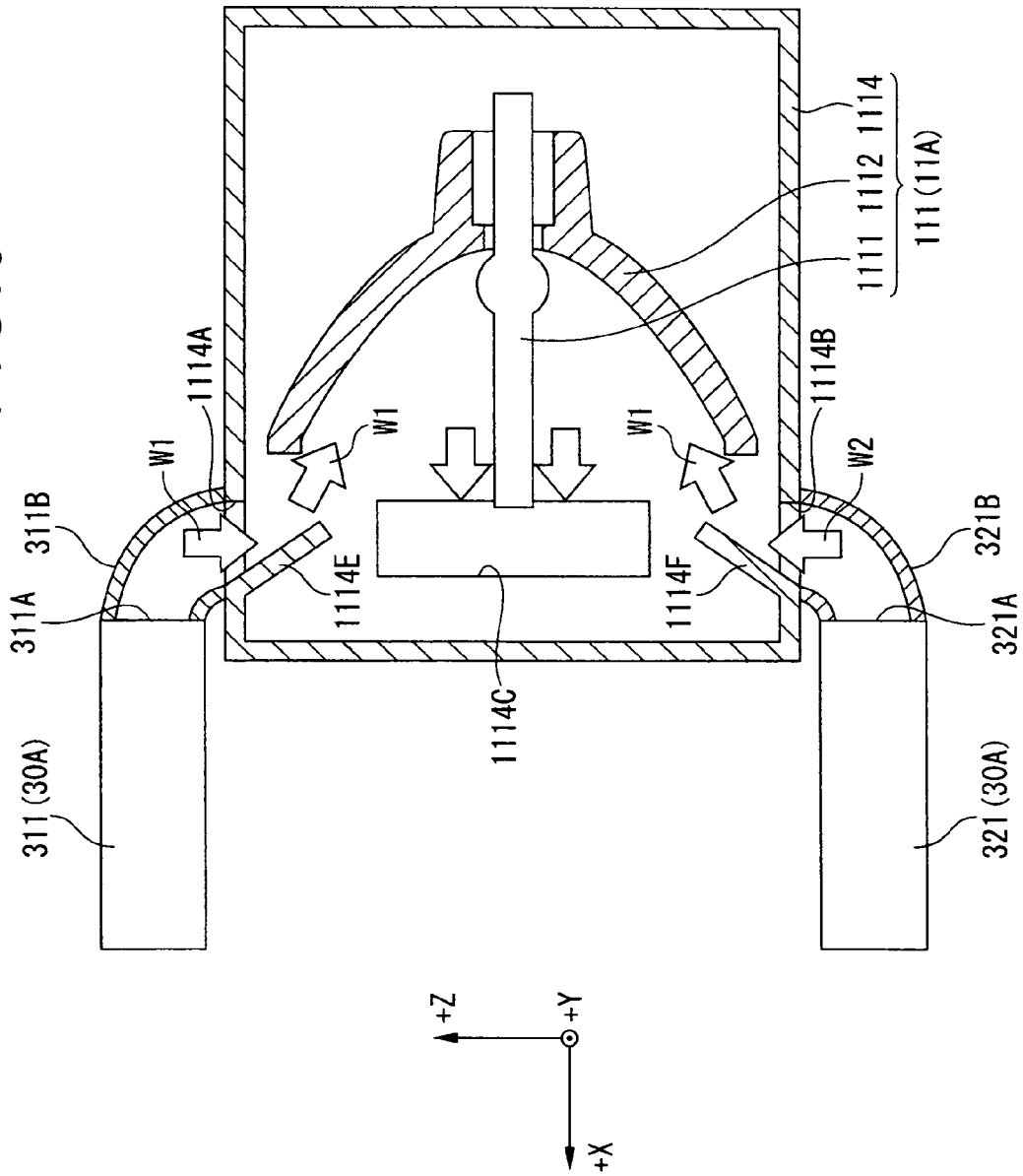

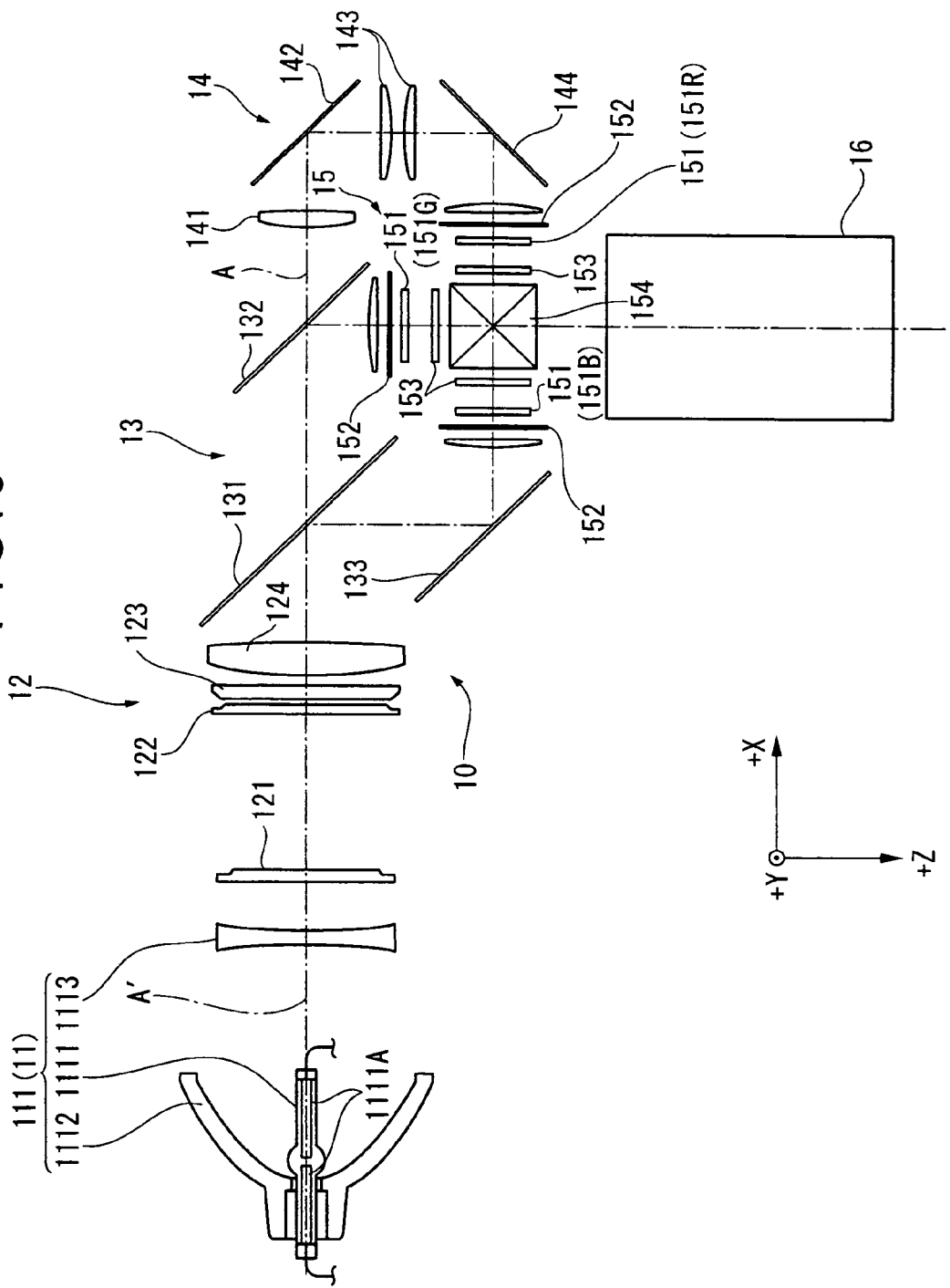

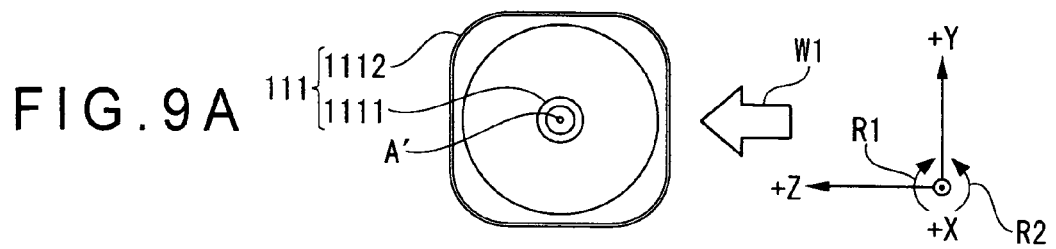

PROJECTOR

The entire disclosure of Japanese Patent Application No. 2007-072460, filed Mar. 20, 2007, and No. 2007-287090, filed Nov. 5, 2007, are expressly incorporated by reference herein.

BACKGROUND

1. Technical Field

The present invention relates to a projector.

2. Related Art

There has been known a projector that includes: a light source device, an optical modulator that modulates a light beam irradiated from the light source device in accordance with image information to form image light; and a projection optical device that projects the image light in an enlarged manner.

As the light source device of such a projector, an electrical-discharge light source device is often used, which includes: a light source lamp having a pair of electrodes between which light is generated by an electrical discharge; and a reflector that reflects a light beam emitted from the light source lamp in manner aligned in a predetermined direction. In the light source device, heat generated in light emission causes temperature rise in the light source lamp, generating thermal convection that causes temperature difference between an upper side and an lower side of the light source lamp. When difference in temperature distribution of the light source lamp is relatively large, blackening and the like are likely to occur on a lamp wall of the light source lamp, thereby causing brightness reduction or bursting of the light source lamp.

Accordingly, in order to reduce the temperature difference between the upper side and the lower side of the light source lamp to efficiently cool the light source lamp, a technique in which cooling fans are used to deliver air to the light source lamp substantially horizontally from a lateral side of the light source lamp has been suggested (see, for example, JP-A-2002-23261).

A technique disclosed in JP-A-2002-23261 is designed on condition that a projector projects image light substantially horizontally in a so-called normal posture in which the projector is set on a desk surface or the like and in a so-called suspended posture in which the projector is suspended from a ceiling upside down relative to the normal posture. In the projector projecting image light in either the normal posture or the suspended posture, air is supplied to the light source lamp in a horizontal direction to reduce the temperature difference between the upper and lower sides of the light source lamp, thereby efficiently cooling the light source lamp.

However, according to the technique disclosed in JP-A-2002-23261, when the projector projects image light in a posture to project image light substantially vertically (up and down direction), i.e. when the projector is in an upward-projecting posture (in which the projector projects image light upward) or in a downward-projecting posture (in which the projector projects image light downward), the cooling fans are located on an upper side or on a lower side of the light source lamp, so that the cooling fans can deliver the air only in a vertical direction relative to the light source lamp. For instance, when the cooling fans deliver the air toward the light source lamp from the lower side to the upper side, the lower side of the light source lamp is mainly cooled, so that the temperature difference is caused between the upper side and the lower side of the light source lamp. Hence, the light source lamp cannot be efficiently cooled.

SUMMARY

An advantage of some aspects of the invention is to provide a projector that can effectively cool a light source lamp in accordance with various image-light projecting postures of the projector.

A projector according to an aspect of the invention includes: a light source lamp; and a cooling device that cools the light source lamp and includes a plurality of cooling fans to deliver air toward the light source lamp. Airflow directions in which the plurality of cooling fans deliver the air toward the light source lamp are different from each other.

The plurality of cooling fans may deliver the air toward the light source lamp directly or via a duct.

In the arrangement, an airflow direction of a single cooling fan of the plurality of cooling fans is set horizontal when the projector projects image light in a normal or suspended posture. With the setting, when the projector projects image light in the normal or suspended posture, it is only necessary to drive the single cooling fan to deliver the air toward the light source lamp in a vertical direction, thereby reducing temperature difference between an upper side and a lower side of the light source lamp to efficiently cool the light source lamp.

Since the airflow directions of the plurality of cooling fans are different from each other, even when the airflow direction of the single cooling fan to the light source lamp is set upward in an upward-projecting or downward-projecting posture of the projector, it is possible to set at least one of the other cooling fans to deliver the air toward the light source lamp in a downward or horizontal direction. Accordingly, when the projector projects image light in the upward-projecting or downward-projecting posture, it is only necessary to drive at least one of the other cooling fans to deliver the air toward the light source lamp in a downward or horizontal direction in order to reduce temperature difference between the upper side and the lower side of the light source lamp, thereby efficiently cooling the light source lamp.

Therefore, it is possible to efficiently cool the light source lamp in accordance with the various image-light projecting postures, thereby attaining an object of the invention.

In the projector, the number of the plurality of cooling fans of the cooling device may preferably be two. The airflow directions may preferably are orthogonal to an optical axis of a light beam irradiated from the light source lamp and are opposed each other when seen in a direction of the optical axis.

The airflow directions of air from the two cooling fans may not be orthogonal to the optical axis. The airflow directions may be set to intersect the optical axis at any angle except for 90 degrees as long as the airflow directions are orthogonal to the optical axis when seen from the optical axis direction.

For example, the projector is arranged to be settable in the normal, upward-projecting, suspended or downward-projecting posture by being rotated by 90 degrees around the optical axis of a light beam irradiated from the light source lamp. With the arrangement, since the airflow directions of the two cooling fans are set as described above, at least one of the two cooling fans can deliver the air toward the light source lamp in a downward direction or in a horizontal direction in any of the aforesaid postures. Hence, the projector arranged as described above can efficiently cool the light source lamp in accordance with the aforesaid various image-light projecting postures.

Further, since each of the cooling devices includes the two cooling fans, it is possible to efficiently cool the light source lamp in accordance with the various image-light projecting postures by the minimum number of cooling fans, so that downsizing of the projector is not hindered.

In the projector, when the projector projects image light in a predetermined posture, the airflow directions may preferably be horizontal.

With the arrangement, when the projector projects image light in a predetermined posture (e.g. the normal posture), the airflow directions are horizontal. Accordingly, in the above arrangement where the projector is rotated by 90 degrees around the optical axis to be set in the aforesaid postures, it is possible to deliver the air toward the light source lamp by at least one of the two cooling fans in a downward direction or in a horizontal direction in any of the postures.

In the projector, the airflow directions may be preferably displaced from each other in a direction orthogonal to the airflow directions.

With the arrangement, since the airflow directions are set as described above, air generated by one cooling fan will not interfere with air generated by the other cooling fan though both of the two cooling fans are driven. In other words, air exhausted from one cooling fan can be prevented from entering the outlet of the other cooling fan. Hence, the two cooling fans can suitably deliver the air toward the light source lamp, thereby more efficiently cooling the light source lamp. In addition, since air exhausted from one cooling fan, i.e. air heated by the light source lamp can be prevented from entering the outlet of the other cooling fan, the cooling fans will not be thermally deteriorated.

In the projector, the number of the plurality of cooling fans of the cooling device may preferably be two. The airflow directions may preferably be orthogonal to the optical axis and to each other when seen in a direction of an optical axis of a light beam irradiated from the light source lamp.

The airflow directions of air generated by the plurality of cooling fans may not be orthogonal to the optical axis but may be set to intersect the optical axis at any angle except for 90 degrees as long as the airflow directions are orthogonal to each other when seen from the optical axis direction.

When the projector is arranged to be rotated by 90 degrees around the optical axis to be set in the aforesaid postures as described above, it is possible to deliver the air toward the light source lamp by at least one of the plurality of cooling fans in a downward direction or in a horizontal direction in any of the postures since the airflow directions of air generated by the plurality of cooling fans are set as described above. Hence, the thus arranged projector can efficiently cool the light source lamp in accordance with the aforesaid various image-light projecting postures.

Further, since each of the cooling devices includes the two cooling fans, it is possible to efficiently cool the light source lamp in accordance with the various image-light projecting postures by the minimum number of cooling fans, so that downsizing of the projector is not be hindered.

In the projector, the airflow directions may preferably be vertical or horizontal when the projector projects image light in a predetermined posture.

With the arrangement, when the projector projects image light in a predetermined posture (e.g. the normal posture), the airflow directions of air generated by the plurality of cooling fans are set to be vertical or horizontal to orthogonal each other when seen from the optical axis direction. Hence, when the projector is arranged to be rotated by 90 degrees around the optical axis to be set in the aforesaid postures, it is possible to securely deliver air toward the light source lamp by at least one of the plurality of cooling fans in a downward direction or in a horizontal direction in any of the postures.

The projector may preferably further include: a fan drive controller that controls the plurality of cooling fans in accordance with a posture of the projector.

The fan drive controller recognizes a posture of the projector as described below.

Specifically, the projector is provided with an operating section with which a user can input a setting of the posture of the projector (for instance, a normal, suspended, upward-projecting or downward-projecting posture). The fan drive controller recognizes the posture of the projector by an operation signal generated in accordance with the input on the operation section.

Alternatively, the projector may be provided with an inclination detector such as a gyro sensor that detects a posture of the projector. In this case, the fan drive controller recognizes the posture of the projector by a signal generated in accordance with the input on the inclination detector.

According to the aspect of the invention, the projector is provided with a fan drive controller that controls the plurality of cooling fans in accordance with a posture of the projector. Since the plurality of cooling fans are controlled by the fan drive controller in accordance with the postures of the projector, the light source lamp can be efficiently cooled in accordance with the aforesaid image-light projecting postures.

BRIEF DESCRIPTION OF THE DRAWINGS

The invention will be described with reference to the accompanying drawings, wherein like numbers reference like elements.

FIG. 5 schematically shows the cooling structure in which the first cooling device cools the light source lamp of the first exemplary embodiment;

FIG. 8 schematically shows an arrangement of an image projecting section of the second exemplary embodiment;

FIG. 9A schematically shows directions in which a cooling device delivers air toward a light source lamp when the projector that projects image light is in a posture of the second exemplary embodiment;

FIG. 9B schematically shows directions in which the cooling device delivers the air toward the light source lamp when the projector that projects image light is in another posture of the second exemplary embodiment;

FIG. 9C schematically shows directions in which the cooling device delivers the air toward the light source lamp when the projector that projects image light is in still another posture of the second exemplary embodiment; and FIG. 9D schematically shows directions in which the cooling device delivers the air toward the light source lamp when the projector that projects image light is in further posture of the second exemplary embodiment.

DESCRIPTION OF EXEMPLARY EMBODIMENT(S)

First Exemplary Embodiment

A first exemplary embodiment of the invention will be described below with reference to the drawings.

Arrangement of Projector

Figure 1:
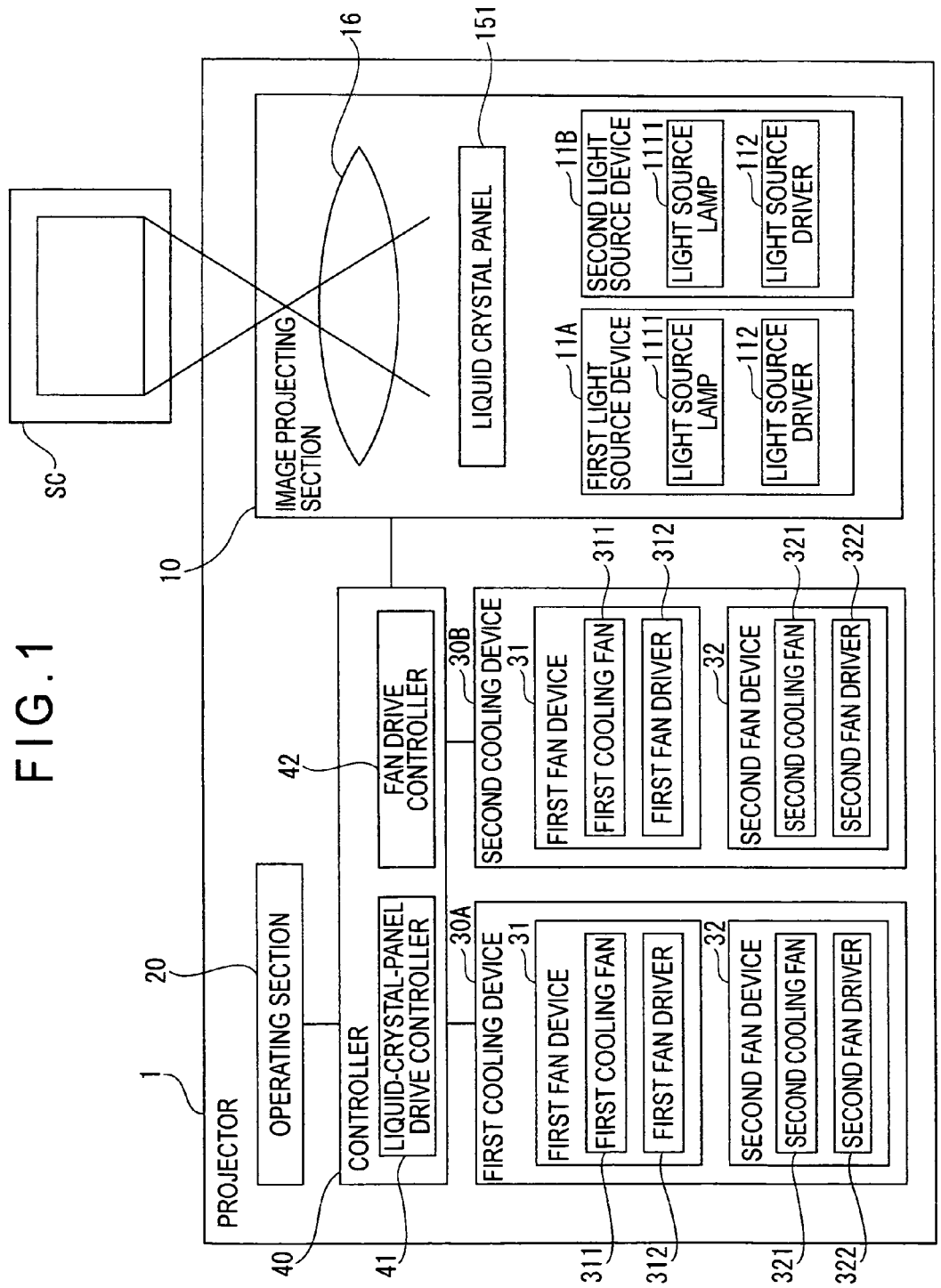
FIG. 1 is a block diagram schematically showing an arrangement of a projector according to a first exemplary embodiment of the invention.

FIG. 1 is a block diagram showing an arrangement of a projector 1.

The projector 1 modulates a light beam irradiated from a light source in accordance with image information to form a color image (image light) and projects the formed color image onto a screen Sc in an enlarged manner. As shown in FIG. 1, the projector 1 mainly includes: an image projecting section 10; an operating section 20; a first cooling device 30A; a second cooling device 30B; a controller 40; and an exterior casing 50 that accommodates the components 10, 30A, 30B and 40 (see FIGS. 3A to 3D).

Figure 2:
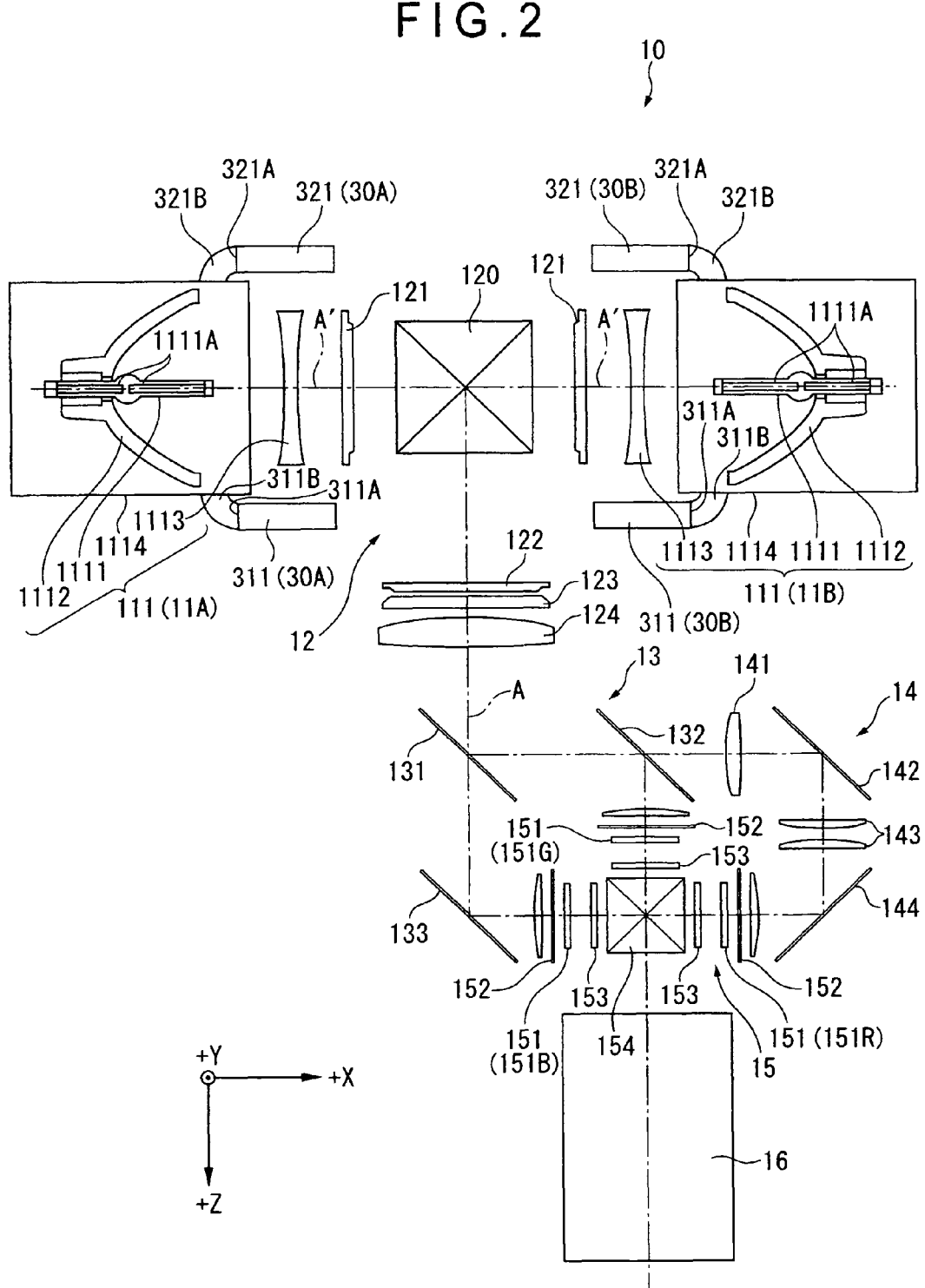
FIG. 2 schematically shows an arrangement of an image projecting section of the first exemplary embodiment.

FIG. 2 schematically shows an arrangement of the image projecting section 10. Note that, in FIG. 1, only a first light source device 11A, a second light source device 11B, a liquid crystal panel 151 and a projection lens 16 are shown as components of the image projecting section 10 in order to simplify the description. In FIG. 2, a projecting direction from the projection lens 16 is defined as Z axis and two axes orthogonal to Z axis are defined as X axis and Y axis, thereby simplifying the description. The same is applied in the other figures. Note that, in FIG. 2, Z axis and X axis are orthogonal to each other in a plane defined by an optical axis A of a light beam that is irradiated from the first and second light source devices 11A, 11B to the projection lens 16 (i.e. Z and X axes intersect in a plane parallel to the paper surface of FIG. 2). Y axis is orthogonal to the plane.

Under the control of the controller 40, the image projecting section 10 forms image light to project the image light on the screen Sc in an enlarged manner. As shown in FIG. 2, the image projecting section 10 includes: the first light source device 11A; the second light source device 11B; an illumination optical device 12; a color separating optical device 13; a relay optical device 14; an optical device 15; and the projection lens 16 (an projection optical device).

The first light source device 11A and the second light source device 11B irradiate a light beam to the illumination optical device 12. Note that, since the light source devices 11A, 11B have the same arrangement, only the first light source device 11A will be described below. The second light source device 11B are given the same reference numerals as the first light source device 11A to omit description thereof.

The first light source device 11A includes: a light source device body 111 (FIG. 2); and a light source driver 112 (FIG. 1) that drives (lights) a light source lamp 1111 (FIG. 1, FIG. 2) of the light source device body 111 at a predetermined drive voltage under the control of the controller 40.

As shown in FIG. 2, the light source device body 111 includes: the light source lamp 1111 in which electric discharge is generated between a pair of electrodes 1111A; a main reflecting mirror 1112; a collimating lens 1113; and a lamp housing 1114. An arrangement of the lamp housing 1114 will be described in detail below in the description of the cooling devices 30A, 30B.

Light emitted from the light source lamp 1111 is aligned by the main reflecting mirror 1112 into an irradiating direction toward a front side of the light source device body 111 and reflected as convergent light. The convergent light is then collimated by the collimating lens 1113 to be irradiated to the illumination optical device 12.

As the light source lamp 1111, a halogen lamp, a metal halide lamp or a high-pressure mercury lamp is often used. The main reflecting mirror 1112 is an ellipsoidal reflector in FIG. 2 but may be a parabolic reflector that substantially collimates light emitted from the light source lamp 1111 and reflects the collimated light. When the parabolic reflector is employed, the collimating lens 1113 is omitted.

As shown in FIG. 2, the above-described light source device bodies 111 of the light source devices 11A, 11B are disposed in X direction to opposed each other with optical axes A' of light beams respectively irradiated from the light source devices 11A, 11B being substantially coincident with each other.

As shown in FIG. 2, the illumination optical device 12 includes: two first lens arrays 121 respectively provided for the light source devices 11A, 11B; a light guiding prism 120; a second lens array 122; a polarization converter 123; and a superposing lens 124. A light beam irradiated from the light source device 11A (11B) is divided into a plurality of partial light beams by the first lens array 121. The plurality of partial light beams irradiated from the first lens arrays 121 are polarized by the light guiding prism 120 substantially by 90 degrees, so that the polarized partial light beams further advance in the same direction (+Z direction) to be focused in the vicinity of the second lens array 122. The partial light beams irradiated from the second lens array 122 are incident on the polarization converter 123 with the central axis (a main light beam) thereof being perpendicular to an incident surface of the polarization converter 123 and then irradiated from the polarization converter 123 as substantially uniform linear polarized light. The plurality of partial light beams irradiated from the polarization converter 123 as linear polarized light pass through the superposing lens 124 to be superposed on three below-described liquid crystal panels of the optical device 15.

As shown in FIG. 2, the color separating optical device 13 includes two dichroic mirrors 131, 132 and a reflecting mirror 133 to separate the plurality of partial light beams irradiated from the illumination optical device 12 into three colors of light (red, green and blue).

As shown in FIG. 2, the relay optical device 14 includes an incident-side lens 141, a relay lens 143 and reflecting mirrors 142, 144 to guide the color light separated by the color separating optical device 13, for example, to guide the red light to a below-described red liquid crystal panel of the optical device 15.

The optical device 15 modulates the incident light beam in accordance with image information to form image light (a color image). As shown in FIG. 2, the optical device 15 includes: the three liquid crystal panels 151 (a red liquid crystal panel 151R, a green liquid crystal panel 151G and a blue liquid crystal panel 151B); incident-side polarizers 152 respectively disposed on the upstream of the liquid crystal panels 151 on optical paths; emitting-side polarizers 153 respectively disposed on the downstream of the liquid crystal panels 151 on the optical paths; and a cross dichroic prism 154.

The three incident-side polarizers 152 only transmit polarized light having a polarization direction substantially the same as that of the light aligned by the polarization converter 123 out of the light beams separated by the color separating optical device 13 while absorbing the other light beams. The incident-side polarizers 152 each include a light-transmissive substrate and a polarization film adhered on the light-transmissive substrate.

Each of the three liquid crystal panels 151 includes a pair of transparent glass substrates and liquid crystal (electrooptic material) sealed between the substrates. Orientation of the liquid crystal is controlled in accordance with a drive signal from the controller 40 to modulate polarization directions of the polarized light beams irradiated from the incident-side polarizers 152.

The three emitting-side polarizers 153 substantially have the same function as the incident-side polarizers 152 and transmit light polarized in a certain direction out of the light beams irradiated through the liquid crystal panels 151 while absorbing the other light beams.

The cross dichroic prism 154 combines the color light that is modulated for each color and irradiated from the emitting-side polarizers 153 in order to form a color image. The cross dichroic prism 154 has a substantially square shape in plan view with four right-angle prisms attached with each other. Two dielectric multi-layered films are formed on the boundaries adhering the right-angle prisms. The dielectric multi-layered films transmit the color light irradiated from the liquid crystal panel 151G through its emitting-side polarizer 153 while reflecting the color light irradiated from the liquid crystal panels 151G, 151B through the emitting-side polarizers 153. Thus, the color light is combined into a color image.

The projection lens 16 is a lens set including a plurality of lenses to project the color image formed by the cross dichroic prism 154 on the screen Sc in an enlarged manner.

FIGS. 3A to 3D schematically show postures of the projector 1.

The operating section 20 includes a remote controller (not shown) or a button or a key provided on the projector 1. The operating section 20 recognizes an input operation by a user to output a predetermined operation signal to the controller 40.

The operating section 20 recognizes, for instance, a user input for "projecting image light from the projector 1 in a normal posture" and outputs an operation signal to the controller 40 in accordance with the input operation.

Figure 3A:
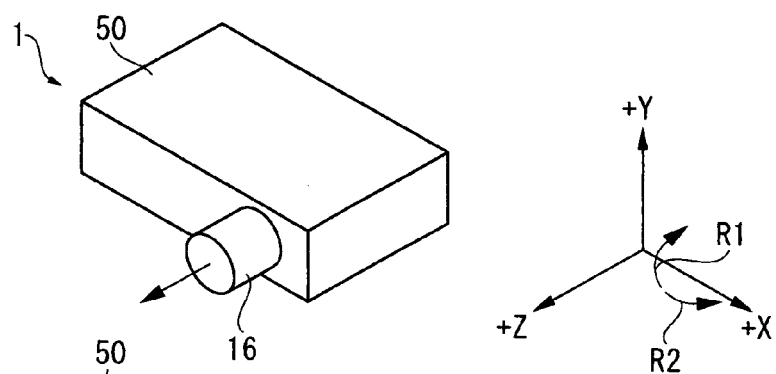
FIG. 3A schematically shows a posture of the projector of the first exemplary embodiment.

The normal posture means a posture in which the projecting direction (Z axis) from the projection lens 16 is substantially horizontal as shown in FIG. 3A.

The operating section 20 also recognizes a user input for "projecting image light from the projector 1 in a suspended posture" and outputs an operating signal to the controller 40 in accordance with the input operation.

Figure 3B:
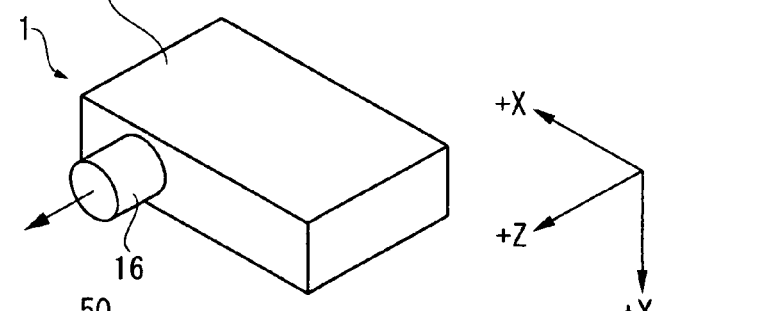
FIG. 3B schematically shows another posture of the projector of the first exemplary embodiment.

The suspended posture means a posture which is rotated from the normal posture (FIG. 3A) by 180 degrees around X axis (the optical axis A') or Z axis as shown in FIG. 3B.

Additionally, the operating section 20 recognizes a user input for "projecting image light from the projector 1 in an upward-projecting posture" and outputs an operating signal to the controller 40 in accordance with the input operation.

Figure 3C:
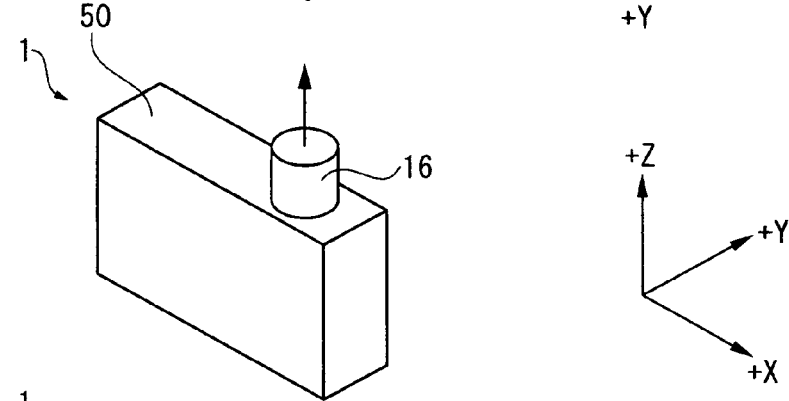
FIG. 3C schematically shows still another posture of the projector of the first exemplary embodiment.

As shown in FIG. 3C, the upward-projecting posture means a posture which is rotated from the normal posture (FIG. 3A) in a direction indicated by arrow R1 (FIG. 3A) around X axis, so that the projecting direction (Z axis) from the projection lens 16 points upward.

Further, the operating section 20 recognizes a user input for "projecting image light from the projector 1 in a downward-projecting posture" and outputs an operating signal to the controller 40 in accordance with the input operation.

Figure 3D:
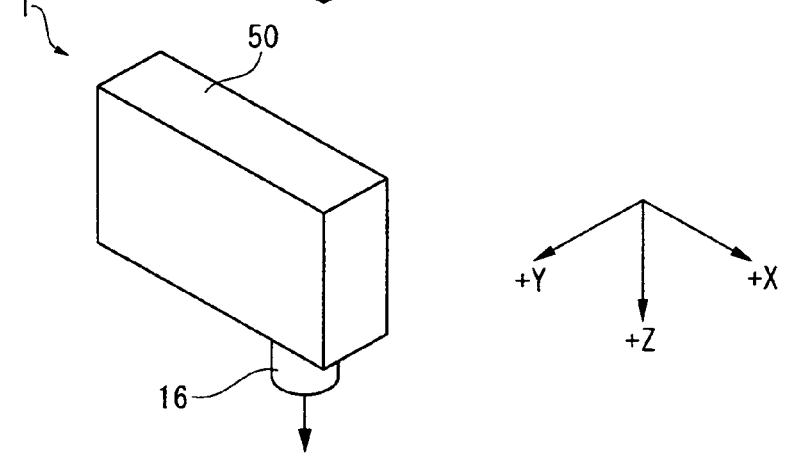
FIG. 3D schematically shows further posture of the projector of the first exemplary embodiment.

As shown in FIG. 3D, the downward-projecting posture means a posture which is rotated from the normal posture (FIG. 3A) in a direction indicated by arrow R2 (FIG. 3A) around X axis, so that the projecting direction from the projection lens 16 (Z axis) points downward.

Figure 4:
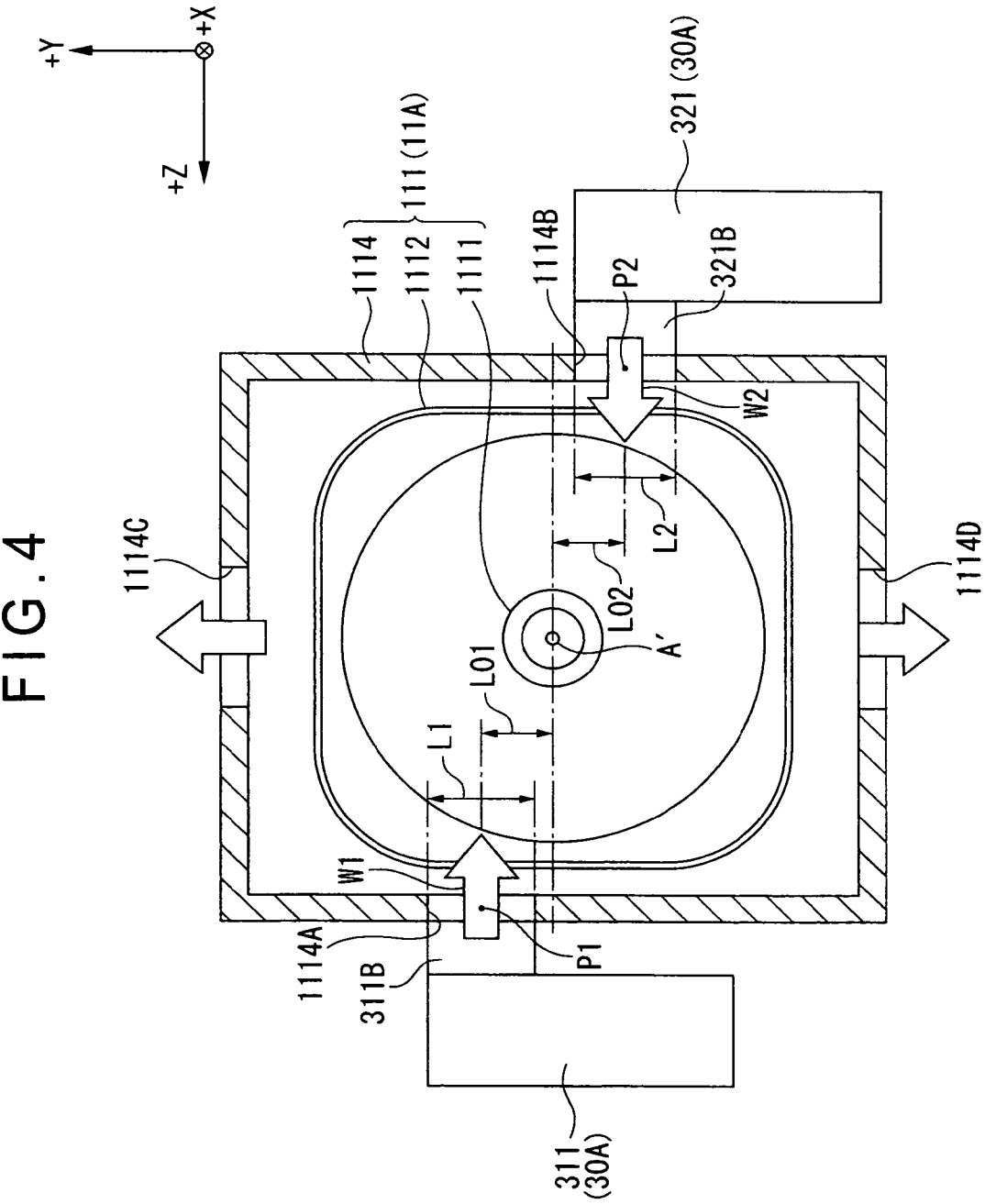
FIG. 4 schematically shows a cooling structure in which a first cooling device cools a light source lamp of the first exemplary embodiment.

FIGS. 4 and 5 schematically show a cooling structure in which the first cooling device 30A cools the light source lamp 1111. Specifically, FIG. 4 shows the cooling structure when seen from a light emitting side. FIG. 5 shows the cooling structure when seen from +Y side.

As shown in FIG. 2, the first cooling device 30A is provided for the first light source device 11A to deliver air toward the light source lamp 1111 of the first light source device 11A.

As shown in FIG. 2, the second cooling device 30B is provided for the second light source device 11B to deliver air toward the light source lamp 1111 of the second light source device 11B.

Note that, since the cooling devices 30A, 30B have the same arrangement, only the first cooling device 30A will be described below. The second cooling device 30B is given the same reference numerals as the cooling device 30A to omit description thereof.

Before describing the arrangement of the first cooling device 30A, an arrangement of the lamp housing 1114 will be described. Note that the lamp housings 1114 of the light source devices 11A, 11B differ from each other only in that inlets 1114A, 1114B and rectifying plates 1114E, 1114F are provided at inverted positions when seen from the light emitting side. Hence, only the lamp housing 1114 of the first light source device 11A will be described below.

As shown in FIG. 4 or 5, the lamp housing 1114 has a substantially rectangular parallelepiped shape in which the light source lamp 1111 and the main reflecting mirror 1112 are accommodated.

As shown in FIG. 4 or 5, the inlets 1114A, 1114B for introducing outside air to the inside of the lamp housing 1114 are formed on a front side in the light emitting direction on both end surfaces of the lamp housing 1114 which intersect Z axis, the inlets 1114A, 1114B.

As shown in FIG. 5, the pair of inlets 1114A, 1114B are opposed each other when seen in Y direction.

Further, as shown in FIG. 4, the opening centers P1, P2 of the pair of inlets 1114A, 1114B are displaced from each other in Y direction when seen in the direction along the optical axis A'.

As shown in FIG. 4 or 5, outlets 1114C, 1114D for exhausting inside air to the outside of the lamp housing 1114 are formed on a front side in the light emitting direction on both end surfaces of the lamp housing 1114 which are orthogonal to the pair of inlets 1114A, 1114B.

More specifically, in the first exemplary embodiment, a length L1 (FIG. 4) in Y direction of the +Z-side inlet 1114A is 15 mm. The opening center P1 of the inlet 1114A is displaced in +Y direction from the optical axis A' by a distance LO1 (FIG. 4) that is 10 mm.

On the other hand, a length L2 (FIG. 4) in Y direction of the −Z-side inlet 1114B is 14 mm. The opening center P2 of the inlet 1114B is displaced in −Y direction from the optical axis A' by a distance LO2 (FIG. 4) that is 10 mm.

Further, the lamp housing 1114 is provided with the rectifying plates 1114E, 1114F respectively extending from inner circumferential ends of the inlets 1114A, 1114B as shown in FIG. 5. The rectifying plates 1114E, 1114F project toward the inside of the lamp housing 1114 from positions on a front side in the light emitting direction on the inner circumferential ends of the inlets 1114A, 1114B with angles relative to surfaces of the lamp housing 1114 which intersect with Z direction. The rectifying plate 1114E rectifies flow of the air introduced through the inlet 1114A into the lamp housing 1114 in a direction tilted from −Z side toward −X side by a predetermined angle. The rectifying plate 1114F rectifies flow of the air introduced through the inlet 1114B into the lamp housing 1114 in a direction tilted from +Z side toward −X side by a predetermined angle.

As shown in FIG. 1, the first cooling device 30A includes a first fan device 31 and a second fan device 32.

As shown in FIG. 1, the first fan device 31 includes a first cooling fan 311 and a first fan driver 312 that drives the first cooling fan 311 at a predetermined drive voltage under the control of the controller 40.

The first cooling fan 311 is a centrifugal fan (a sirocco fan) that sucks air in its rotation axis direction and exhausts the air tangentially relative to a rotating direction. As shown in FIG. 2, 4 or 5, the first cooling fan 311 is disposed on +Z side of the lamp housing 1114 with an air exhaust port 311A for air exhaust (FIG. 2, FIG. 5) directed to −X side. The inlet 114A of the lamp housing 1114 is coupled with the exhaust port 311A by a duct 311B.

Accordingly, air exhausted from the exhaust port 311A of the first cooling fan 311 is introduced into the lamp housing 1114 via the duct 311B and the inlet 1114A. The air introduced into the lamp housing 1114 is rectified by the rectifying plate 1114E to flow to −Z side and to +Y side of the light source lamp 1111. The air flowed to the light source lamp 1111 further advances along a reflecting surface of the main reflecting mirror 1112 to be exhausted to the outside of the lamp housing 1114 through the outlets 1114C, 1114D.

As shown in FIG. 1, the second fan device 32 includes a second cooling fan 321 and a second fan driver 322 that drives the second cooling fan 321 at a predetermined drive voltage under the control of the controller 40.

The second cooling fan 321 is a sirocco fan that is disposed on −Z side of the lamp housing 1114 with an exhaust port 321A directed to −X side as shown in FIG. 2, 4 or 5. The inlet 1114B of the lamp housing 1114 is coupled with the exhaust port 321A by a duct 321B.

Accordingly, air exhausted from the exhaust port 321A of the second cooling fan 321 is introduced into the lamp housing 1114 via the duct 321B and the inlet 1114B. The air introduced into the lamp housing 1114 is rectified by the rectifying plate 1114F to flow to +Z side and to +Y side of the light source lamp 1111. The air flowed to the light source lamp 1111 further advances along a reflecting surface of the main reflecting mirror 1112 to be exhausted to the outside of the lamp housing 1114 through the outlets 1114C, 1114D.

As described above, airflow direction W1 of air supplied by the first cooling fan 311 to the light source lamp 1111 and airflow direction W2 of air supplied by the second cooling fan 321 to the light source lamp 1111 are set to orthogonal to the optical axis A' and to opposed each other when seen from the optical axis A' direction as shown in FIG. 4. Airflow directions W1, W2 are displaced from each other in Y direction that is orthogonal to airflow directions W1, W2.

Figure 6A:
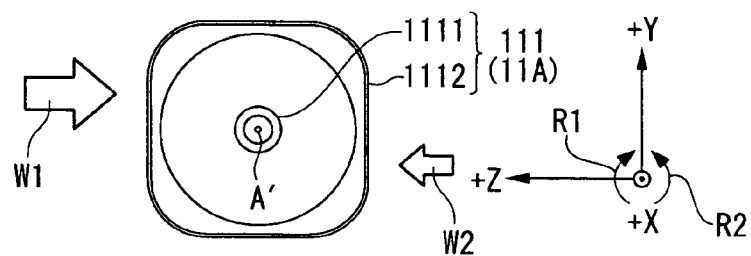
FIG. 6A schematically shows directions in which the first cooling device fans the light source lamp when the projector that projects image light is in a posture of the first exemplary embodiment.
Figure 6B:
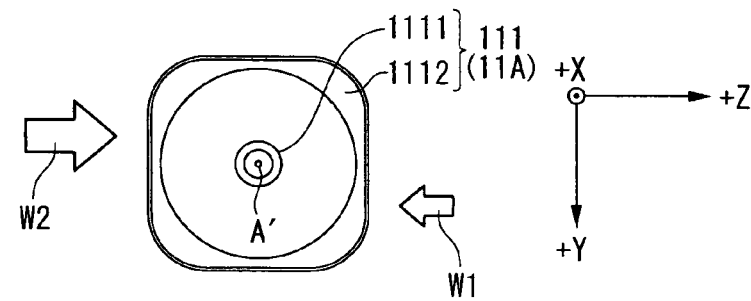
FIG. 6B schematically shows directions in which the first cooling device fans the light source lamp when the projector that projects image light is in another posture of the first exemplary embodiment.
Figure 6C:
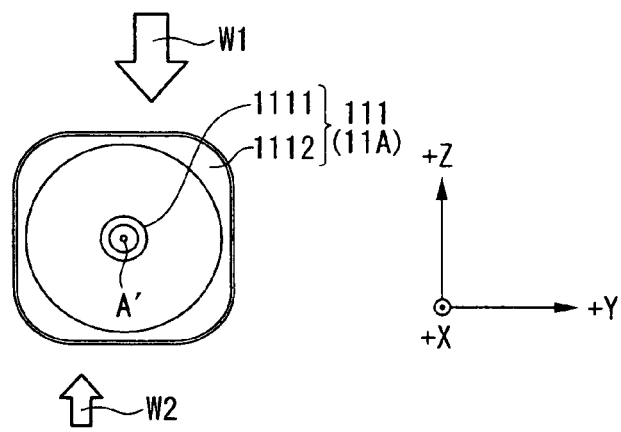
FIG. 6C schematically shows directions in which the first cooling device delivers air toward the light source lamp when the projector that projects image light is in still another posture of the first exemplary embodiment.
Figure 6D:
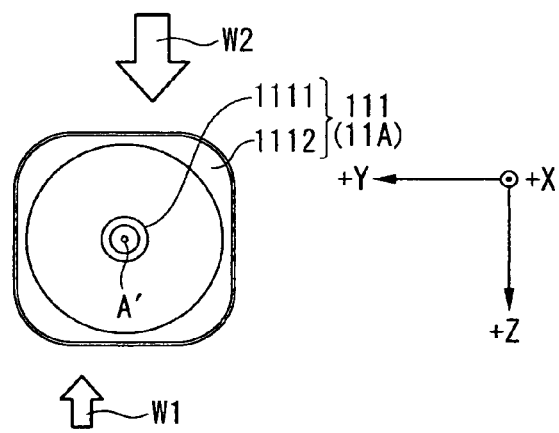
FIG. 6D schematically shows directions in which the first cooling device delivers the air toward the light source lamp when the projector that projects image light is in further posture of the first exemplary embodiment.

FIGS. 6A to 6D schematically show airflow directions W1, W2 in which the first cooling device 30A delivers air toward the light source lamp 1111 when the projector 1 projects image light in various postures. Specifically, FIGS. 6A to 6D show airflow directions W1, W2 when seen from the light emitting side. FIG. 6A, which corresponds to FIG. 3A, shows airflow directions W1, W2 when the projector 1 projects image light in the normal posture. FIGS. 6B to 6D respectively correspond to FIGS. 3B to 3D.

When the projector 1 projects image light in the normal posture, airflow directions W1, W2 are set to vertically opposed each other as shown in FIG. 6A.

As shown in FIG. 6B, when the projector 1 projects image light in the suspended posture, airflow directions W1, W2 are rotated from their positions in the normal posture by 180 degrees around the optical axis A' (X axis) to horizontally point the opposite sides of those in the normal posture.

When the projector 1 projects image light in the upward-projecting posture, airflow directions W1, W2 are set as described below.

As shown in FIG. 6C, airflow directions W1, W2 are rotated from their positions in the normal posture in arrow R1 direction (FIG. 6A) around the optical axis A' by 90 degrees.

Specifically, airflow direction W1 points downward in a vertical direction. On the other hand, airflow direction W2 points upward in a vertical direction.

When the projector 1 projects image light in the downward-projecting posture, airflow directions W1, W2 are set as described below.

As shown in FIG. 6D, airflow directions W1, W2 are rotated from their positions in the normal posture in arrow R2 direction (FIG. 6A) by 90 degrees around the optical axis A'.

Specifically, airflow direction W1 points upward in a vertical direction. On the other hand, airflow direction W2 points downward in a vertical direction.

The controller 40 includes a CPU (Central Processing Unit) and the like to control the entire projector 1 in accordance with a control program stored in a memory (not shown). Note that, as the arrangement of the controller 40, a function of the controller 40 to control the cooling devices 30A, 30B will be mainly described below and description of the other functions will be simplified or omitted. As shown in FIG. 1, the controller 40 includes a liquid-crystal-panel drive controller 41, a fan drive controller 42 and the like.

The liquid-crystal-panel drive controller 41 conducts image processing on digital image data that is a signal-conditioned image signal (image information) to generate a drive signal from the image-processed digital image data and outputs the drive signal to the liquid crystal panels 151 by which a predetermined optical image is formed. The image processing includes: image size adjustment such as magnification and downsizing; trapezoidal warping correction; image quality adjustment; and gamma correction.

The fan drive controller 42 recognizes a posture of the projector 1 by an operating signal input from the operating section 20 in order to control the cooling devices 30A, 30B. Note that, since the fan drive controller 42 controls the cooling devices 30A, 30B in the same manner, only a structure to control the first cooling device 30A will be described below. In FIGS. 6A to 6D, arrows W1, W2 that indicate airflow directions will be shown in different sizes depending on an air amount for easy description, i.e. one of arrows W1, W2 of which air amount is larger than the other arrow is shown in a larger size and the other arrow of which air amount is smaller is shown in a smaller size.

When the operation signal for "projecting image light from the projector 1 in the normal posture" is input from the operating section 20, the fan drive controller 42 outputs predetermined control commands to the fan drivers 312, 322, thereby controlling an air amount from the first cooling fan 311 to be larger than that from the second cooling fan 321 as shown in FIG. 6A.

When the operation signal for "projecting image light from the projector 1 in the suspended posture" is input from the operating section 20, the fan drive controller 42 outputs predetermined control commands to the fan drivers 312, 322, thereby controlling the air amount from the second cooling fan 321 to be larger than that from the first cooling fan 311 as shown in FIG. 6B.

When the operation signal for "projecting image light from the projector 1 in the upward-projecting posture" is input from the operating section 20, the fan drive controller 42 outputs predetermined control commands to the fan drivers 312, 322, thereby controlling the air amount from the first cooling fan 311 to be larger than that from the second cooling fan 321 as shown in FIG. 6C.

When the operation signal for "projecting image light from the projector 1 in the downward-projecting posture" is input from the operating section 20, the fan drive controller 42 outputs predetermined control commands to the first and second fan drivers 312, 322, thereby controlling the air amount from the second cooling fan 321 to be larger than that from the first cooling fan 311 as shown in FIG. 6D.

As described above, the fan drive controller 42 controls the first cooling device 30A in accordance with the posture of the projector 1 such that the air amount from the cooling fan 311 (321) located on the upper side is larger than that of the cooling fan 321 (311) on the lower side.

For example, when the air amount from the lower cooling fan is set zero, air that is generated by the upper cooling fan and heated by the light source lamp 1111 enters the lower cooling fan, causing thermal deterioration of the lower cooling fan. Hence, the fan drive controller 42 controls the two cooling fans 311, 321 to be driven simultaneously with each other.

According to the above-described first exemplary embodiment, following advantages can be obtained.

In the first exemplary embodiment, the first cooling device 30A includes the first cooling fan 311 and the second cooling fan 321 of which airflow directions W1, W2 toward the light source lamp 1111 are set as described above.

Accordingly, when the projector 1 projects image light in the normal or suspended posture, the first and second cooling fans 311, 321 horizontally deliver air toward the light source lamp 1111. Hence, the temperature difference between the upper side and the lower side of the light source lamp 1111 can be reduced, so that the light source lamp 1111 can be efficiently cooled.

Even when the projector 1 projects image light in the upward-projecting posture and airflow direction W2 is set to deliver air toward the light source lamp 1111 from the lower side to the upper side, airflow direction W1 can be set to deliver air toward the light source lamp 1111 from the upper side to the lower side. Hence, even when the projector 1 projects image light in the upward-projecting posture, the first cooling fan 311 can deliver the air toward the light source lamp 1111 from the upper side to the lower side, thereby reducing the temperature difference between the upper and lower sides of the light source lamp 1111 to efficiently cool the light source lamp 1111.

Similarly, when the projector 1 projects image light in the downward-projecting posture, airflow direction W2 is set to deliver air toward the light source lamp 1111 from the upper side to the lower side, so that the light source lamp 1111 can be efficiently cooled.

Therefore, the light source lamp 1111 can be efficiently cooled in accordance with the postures of the projector 1 at which the image light is projected.

Note that, similarly to the first cooling device 30A, the second cooling device 30B also includes the first cooling fan 311 and the second cooling fan 321, so that the two light source lamp 1111 can be efficiently cooled by the cooling devices 30A, 30B.

The projector 1 is set to the normal, upward-projecting, suspended or downward-projecting posture by being rotated by 90 degrees around the optical axis A' (X axis) of a light beam irradiated from the light source device body 111. Airflow directions W1, W2 are set to opposed each other when seen in the optical axis A' direction. Accordingly, in any of the aforesaid postures, at least one of the first cooling fan 311 and the second cooling fan 321 delivers air toward the light source lamp 1111 in a downward direction or in a horizontal direction. Hence, the light source lamp 1111 can be efficiently cooled in accordance with the aforesaid various image-light projecting postures.

When the projector 1 projects image light in the normal and suspended postures, the first cooling fan 311 and the second cooling fan 321 are set to deliver air toward in horizontal directions. Accordingly, in any of the aforesaid postures, at least one of the first cooling fan 311 and the second cooling fan 321 can securely deliver the air toward the light source lamp 1111 in a downward direction or in a horizontal direction.

Each of the cooling devices 30A, 30B includes the two fans: the first cooling fan 311 and the second cooling fan 321. Hence, the two light source lamps 1111 can be efficiently cooled by the minimum number of cooling fans in accordance with the aforesaid image-light projecting postures, so that downsizing of the projector 1 is not hindered.

Further, airflow directions W1, W2 are displaced from each other in Y direction. Accordingly, although the two cooling fans 311, 321 are simultaneously driven, air generated by one cooling fan will not interfere with air generated by the other cooling fan. In other words, air exhausted from one cooling fan can be prevented from entering the outlet of the other cooling fan. Hence, the two cooling fans 311, 321 suitably deliver air toward the light source lamp 1111, thereby more efficiently cooling the light source lamp 1111. In addition, since air exhausted from one cooling fan, i.e. air heated by the light source lamp 1111 can be prevented from entering the outlet of the other cooling fan, the cooling fans 311, 321 will not be thermally deteriorated. Further, since both of the cooling fans 311, 321 are simultaneously driven, the cooling fans 311, 321 constantly suck low-temperature air to cool the light source lamp 1111, so that air exhausted from one cooling fan and heated by the light source lamp 1111 can be prevented from entering the outlet of the other cooling fan. Accordingly, thermal deterioration of the cooling fans 311, 321 can be avoided.

The projector 1 includes the fan drive controller 42 that controls the first cooling fan 311 and the second cooling fan 321 in accordance with the postures of the projector 1. Accordingly, since the fans 311, 321 are controlled by the fan drive controller 42 in accordance with the postures of the projector 1, the light source lamp 1111 can be efficiently cooled in accordance with the aforesaid image-light projecting postures.

Additionally, the fan drive controller 42 controls the cooling device 30A, 30B in accordance with the postures of the projector 1 such that the air amount from the upper cooling fan 311 (321) becomes larger than that of the lower cooling fan 321 (311). Hence, the upper side of the light source lamp 1111 can be efficiently cooled in accordance with the aforesaid image-light projecting postures.

Note that, in the first exemplary embodiment, only the normal, suspended, upward-projecting and downward-projecting postures are exemplified as a posture of the projector 1 to simplify the description. However, the projector 1 can be set in various image-light projecting postures oriented in any direction of 360 degrees around the optical axis A'. Hence, the above-exemplified advantages can be also obtained in the projector 1 set in any of the various postures.

Second Exemplary Embodiment

A second exemplary embodiment of the invention will be described below with reference to the attached drawings.

In the description below, similar structures and the same components as the first exemplary embodiment are given the same reference numerals to omit or simplify detailed description thereof.

Figure 7:
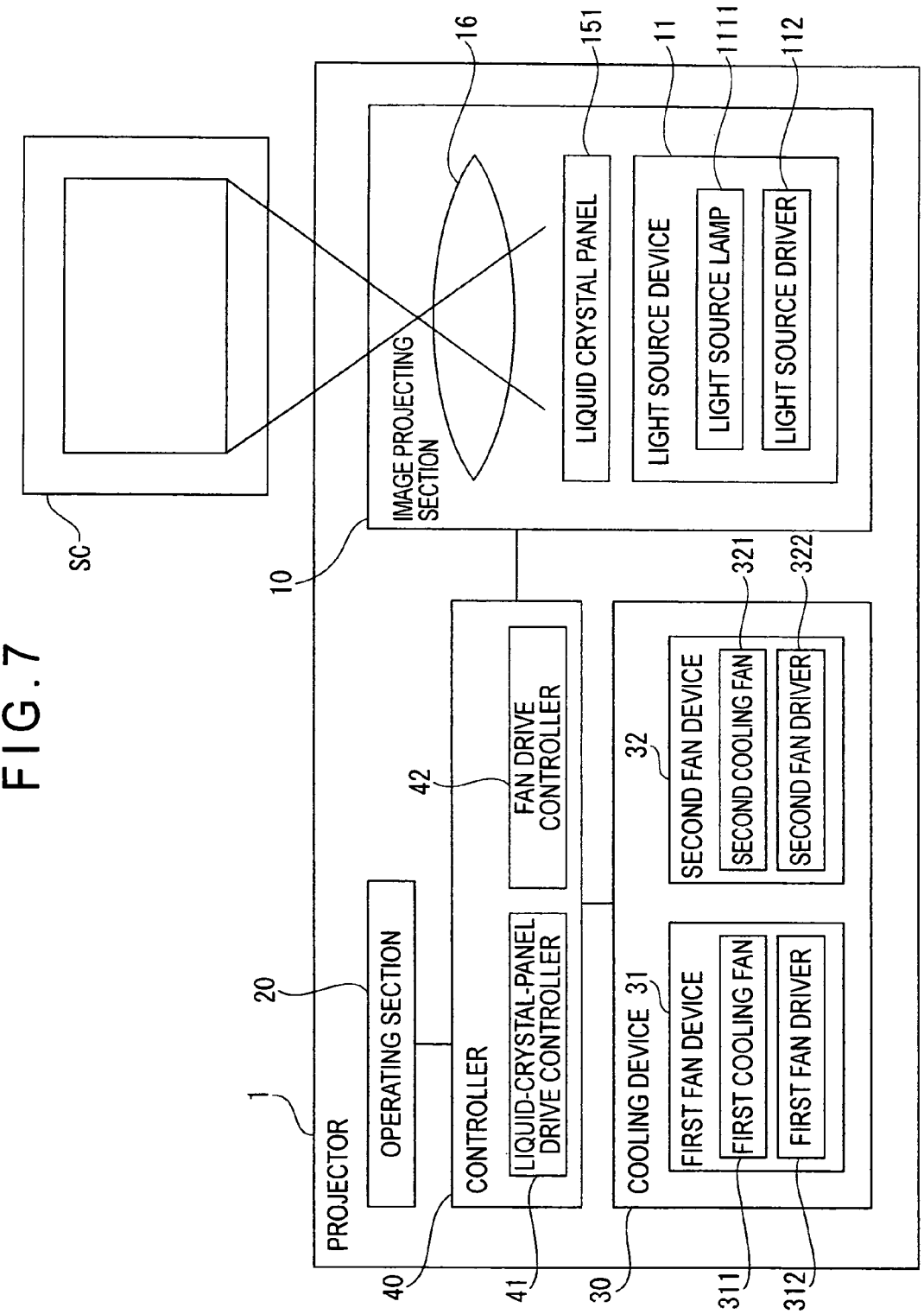
FIG. 7 is a block diagram schematically showing an arrangement of a projector according to a second exemplary embodiment of the invention.

FIG. 7 is a block diagram schematically showing an arrangement of a projector 1 of the second exemplary embodiment.

FIG. 8 schematically shows an arrangement of an image projecting section 10 of the second exemplary embodiment.

In the first exemplary embodiment, the projector 1 includes two lights: the two light source devices 11A, 11B. The projector 1 also includes the two cooling devices 30A, 30B respectively for the two lights. The airflow directions W1, W2 are set to orthogonal to the optical axis A' and to opposed each other when seen in the optical axis A' direction.

On the other hand, in the second exemplary embodiment, the projector 1 only includes a single light, i.e. a light source device 11 as shown in FIG. 7 or 8. As shown in FIG. 7, the projector 1 only includes a single cooling device 30 for the single light. The airflow directions W1, W2 are set to perpendicularly intersect the optical axis A' and to be orthogonal to each other.

The other arrangements are identical with those of the first exemplary embodiment.

In the second exemplary embodiment, as shown in FIG. 8, the image projecting section 10 has an arrangement suitable for the single light, in which one of the two first lens arrays 121 and the light guiding prism 120 of the first exemplary embodiment are omitted, forming a substantially L shape in plan view.

FIGS. 9A to 9D schematically show airflow directions W1, W2 in which the cooling device 30 delivers air toward the light source lamp 1111 when the projector 1 projects image light in various postures according to the second exemplary embodiment. Specifically, FIGS. 9A to 9D respectively correspond to FIGS. 3A to 3D in the same manner as FIG. 6A to 6D.

As shown in FIGS. 9A to 9D, the first cooling fan 311 of the two cooling fans 311, 321 is set to deliver air toward the light source lamp 1111 from −Z side to +Z side (in the directions indicated by arrows W1).

As shown in FIGS. 9A to 9D, the second cooling fan 321 is set to deliver air toward the light source lamp 1111 from −Y side to +Y side (in directions indicated by arrows W2).

When the projector 1 projects image light in the normal posture, airflow directions W1, W2 are set as described below.

Specifically, airflow direction W1 points horizontally as shown in FIG. 9A. On the other hand, airflow direction W2 points (vertically) upward as shown in FIG. 9A.

As shown in FIG. 9B, when the projector 1 projects image light in the suspended posture, airflow direction W1 is rotated from its position in the normal posture by 180 degrees around the optical axis A' as in the first exemplary embodiment in order to horizontally point the opposite side of the normal posture. On the other hand, airflow direction W2 points (vertically) downward as shown in FIG. 9B.

As shown in FIG. 9C, when the projector 1 projects image light in the upward-projecting posture, airflow direction W1 is rotated from its position in the normal posture by 90 degrees around the optical axis A' as in the first exemplary embodiment in order to point (vertically) upward. On the other hand, airflow direction W2 points horizontally as shown in FIG. 9C.

As shown in FIG. 9D, when the projector 1 projects image light in the downward-projecting posture, airflow direction W1 is rotated from its position in the normal posture in arrow R2 direction by 90 degrees around the optical axis A' (FIG. 9A) as in the first exemplary embodiment in order to vertically point downward. On the other hand, airflow direction W2 points horizontally as shown in FIG. 9D.

Note that, although not specifically shown in the figures, in the second exemplary embodiment as well as the first exemplary embodiment, ducts and lamp housings are respectively provided between the first and second cooling fans 311, 321 and the light source lamp 1111 (the light source device body 111).

In the second exemplary embodiment as well as the first exemplary embodiment, as shown in FIGS. 9A to 9D, the fan drive controller 42 controls the cooling device 30 in accordance with the postures of the projector 1 such that the two cooling fans 311, 321 are simultaneously driven with the air amount from the cooling fan 311 (321) on the upper side being larger than the other cooling fan 321 (311) on the lower side.

Even when airflow directions W1, W2 are set to orthogonal to each other as described above, the same advantages as the first exemplary embodiment can be also obtained in the second exemplary embodiment.

Note that the invention is not limited to the above-described exemplary embodiments but encompasses modifications, improvements and the like as long as an object of the invention can be attained.

In the exemplary embodiments, the cooling device 30, 30A 30B may not have the above-described arrangement.

Specifically, although the cooling devices 30, 30A, 30B each include the two cooling fans 311, 321 in the exemplary embodiments, three or more cooling fans may be provided.

Although airflow directions W1, W2 of the two cooling fans 311, 321 are set by the rectifying plates 1114E, 1114F so as to intersect the optical axis A' at an angle other than 90 degrees in the exemplary embodiments, airflow directions W1, W2 may be orthogonal to the optical axis A'.

Further, airflow directions W1, W2 of the two cooling fans 311, 321 are set to orthogonal to the optical axis A' and to opposed each other when seen in the optical axis A' direction in the exemplary embodiments but may not be so arranged as long as airflow directions W1, W2 point different directions.

The two cooling fans 311, 321 may not be sirocco fans but may be axial fans that suck and exhaust air in the same direction.

In the exemplary embodiments, the fan drive controller 42 recognizes a posture of the projector 1 by an operating signal input from the operating section 20 and controls the cooling devices 30, 30A, 30B based on recognition results.

However, the projector 1 may be provided with, for instance, an inclination detector such as a gyro sensor that detects a posture of the projector 1. The fan drive controller 42 may be arranged to recognize a posture of the projector 1 by a signal input from the inclination detector and to control the cooling devices 30, 30A, 30B based on recognition results.

In the exemplary embodiments, the fan drive controller 42 may control the cooling devices 30, 30A, 30B in a manner different from the exemplary embodiments.

For example, although the fan drive controller 42 drives both of the first and second cooling fans 311, 321 in the exemplary embodiments, only one of the first cooling fan 311 and the second cooling fan 321 may be driven.

The image projecting section 10 is arranged such that the optical axis A' (X axis) of a light beam irradiated from the light source device 11, 11A, 11B are orthogonal to the projecting direction (Z axis) from the projection lens 16 in the exemplary embodiments, but the optical axis A' may be arranged in parallel to the projecting direction.

In the first exemplary embodiment, airflow directions W1, W2 may be arranged to point the directions described in the second exemplary embodiment. On the other hand, in the second exemplary embodiment, airflow directions W1, W2 may be arranged to point the directions described in the first exemplary embodiment.

In the exemplary embodiments, the projector 1 is a three-panel projector having the three liquid crystal panels 151. However, the projector 1 may be a single-panel projector having a single liquid crystal panel. Alternatively, the projector may be provided with two or four or more liquid crystal panels.

In the exemplary embodiments, the transmissive liquid crystal panel that has a light incident side and a light emitting side individually are used. However, a reflective liquid crystal panel having a common light-incident and light-emitting side may be alternatively used.

In the exemplary embodiments, the liquid crystal panels are employed as the optical modulators, but the optical modulators may be a device other than liquid crystal such as a device having a micro-mirror. In such an arrangement, the polarizers 152, 153 on the light incident side and the light emitting side can be omitted.

Since the present invention can efficiently cool a light source lamp in accordance with various image-light projecting postures, the present invention can be utilized in a projector used for presentation, a home theater system and the like.

What is claimed is:

1. A projector, comprising:
   a light source lamp; and
   a cooling device that cools the light source lamp and includes two cooling fans to deliver air toward the light source lamp, wherein
   airflow directions in which the two cooling fans deliver the air toward the light source lamp are different from each other;
   the airflow directions are orthogonal to an optical axis of a light beam irradiated from the light source lamp and are opposed to each other when seen in a direction of the optical axis, and
   the airflow directions are displaced from each other in a direction orthogonal to the airflow directions.

2. The projector according to claim 1, wherein
   when the projector projects image light in a predetermined posture, the airflow directions are horizontal.

3. The projector according to claim 1, further comprising
   a fan drive controller that controls the two cooling fans in accordance with a posture of the projector.

4. The projector according to claim 3, wherein
   the fan drive controller controls an air amount from one of the two cooling fans located on an upper side to be larger than an air amount from the other of the two cooling fans located on a lower side.

5. The projector according to claim 4, wherein
   the fan drive controller controls the two cooling fans so that the air amount from the two cooling fans is more than zero.

* * * * *